(12) United States Patent
Aguilar, Jr. et al.

(10) Patent No.: US 8,458,707 B2
(45) Date of Patent: Jun. 4, 2013

(54) TASK SWITCHING BASED ON A SHARED MEMORY CONDITION ASSOCIATED WITH A DATA REQUEST AND DETECTING LOCK LINE RESERVATION LOST EVENTS

(75) Inventors: Maximino Aguilar, Jr., Georgetown, TX (US); Michael Norman Day, Round Rock, TX (US); Mark Richard Nutter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1226 days.

(21) Appl. No.: 12/049,317

(22) Filed: Mar. 15, 2008

(65) Prior Publication Data

US 2008/0163241 A1 Jul. 3, 2008

Related U.S. Application Data

(63) Continuation of application No. 11/204,424, filed on Aug. 16, 2005, now abandoned.

(51) Int. Cl.
  *G06F 9/46* (2006.01)
  *G06F 12/00* (2006.01)
  *G06F 7/38* (2006.01)

(52) U.S. Cl.
  USPC ........... 718/102; 718/104; 718/107; 718/108; 711/147; 712/228

(58) Field of Classification Search
  None
  See application file for complete search history.

(56) References Cited

U.S. PATENT DOCUMENTS

| | | | |
|---|---|---|---|
| 6,018,785 A | 1/2000 | Wenniger | 710/200 |
| 6,195,676 B1 * | 2/2001 | Spix et al. | 718/107 |
| 6,493,741 B1 | 12/2002 | Emer et al. | 718/107 |
| 6,513,057 B1 * | 1/2003 | McCrory | 718/102 |
| 6,578,065 B1 | 6/2003 | Aglietti et al. | 718/104 |
| 6,829,762 B2 * | 12/2004 | Arimilli et al. | 718/1 |
| 6,983,461 B2 * | 1/2006 | Hutchison et al. | 718/104 |
| 7,174,554 B2 | 2/2007 | Pierce et al. | 718/107 |
| 7,234,143 B2 * | 6/2007 | Venkatasubramanian | 718/102 |
| 7,240,137 B2 | 7/2007 | Aguilar et al. | 710/269 |
| 2003/0061255 A1 * | 3/2003 | Shah et al. | 709/100 |
| 2003/0163509 A1 * | 8/2003 | McKean et al. | 709/100 |
| 2005/0086030 A1 * | 4/2005 | Zeidman | 703/1 |
| 2006/0117316 A1 * | 6/2006 | Cismas et al. | 718/103 |
| 2006/0259907 A1 * | 11/2006 | Bhatia et al. | 718/104 |

OTHER PUBLICATIONS

Office action for co-pending U.S. Appl. No. 11/204,424, mailed Oct. 27, 2009, 10 pages.

* cited by examiner

*Primary Examiner* — Meng An
*Assistant Examiner* — Tammy Lee
(74) *Attorney, Agent, or Firm* — VanLeeuwen & VanLeeuwen; Matthew B. Talpis

(57) ABSTRACT

An approach that uses a handler to detect asynchronous lock line reservation lost events, and switching tasks based upon whether a condition is true or a mutex lock is acquired is presented. A synergistic processing unit (SPU) invokes a first thread and, during execution, the first thread requests external data that is shared with other threads or processors in the system. This shared data may be protected with a mutex lock or other shared memory synchronization constructs. When requested data is not available, the SPU switches to a second thread and monitors lock line reservation lost events in order to check when the data is available. When the data is available, the SPU switches back to the first thread and processes the first thread's request.

14 Claims, 9 Drawing Sheets

```
mutex_lock(ea)
  do
    data = getllr(ea)           — 710
    if (data == 0)              — 720
      success = putc(ea, taskID);   — 730
    else
      yield_mutex(ea, taskID);  — 740
      success = 1;
  while (!success)
```

*Figure 7A*

```
do
  data = getllr(ea)             — 760
  if (data == 0)                — 770
    success = putc(ea, taskID)  — 780
  else
    return_from_handler();      — 785
while (!success)

awaken_task(taskID);            — 790
return_from_handler();
```

*Figure 7B*

TASK SWITCHING BASED ON A SHARED MEMORY CONDITION ASSOCIATED WITH A DATA REQUEST AND DETECTING LOCK LINE RESERVATION LOST EVENTS

RELATED APPLICATIONS

This application is a continuation application of U.S. Non-Provisional patent application Ser. No. 11/204,424, entitled "System and Method for Light Weight Task Switching When a Shared Memory Condition is Signaled," filed on Aug. 16, 2005 now abandoned.

BACKGROUND OF THE INVENTION

1. Technical Field

The present invention relates in general to a system and method for lightweight task switching when a shared memory condition is signaled. More particularly, the present invention relates to a system and method for using a handler to detect asynchronous lock line reservation lost events, and switching tasks based upon whether a condition is true or whether a processor acquires a mutex lock.

2. Description of the Related Art

Computer applications typically run multiple threads to perform different tasks that request access to shared data. Common approaches to accessing shared data are 1) using a mutual exclusion (mutex) lock primitive or 2) using a condition wait primitive.

A mutex lock allows multiple threads to "take turns" sharing the same resource, such as accessing a file. Typically, when a program starts, the program creates a mutex object for a given resource by requesting the resource from the system, whereby the system returns a unique name or identifier for the resource. After that, a thread requiring the resource uses the mutex to "lock" the resource from other threads while the thread uses the resource. When the mutex is locked, the system typically queue's threads requesting the resource and then gives control to the threads when the mutex becomes unlocked.

A condition wait primitive allows a thread to identify whether a condition has occurred by accessing cache line data, such as whether a video card has completed a vertical retrace. The condition wait primitive allows a thread to wait until a particular condition is met before proceeding. A challenge found with both mutex lock primitives and condition wait primitives is that system performance decreases when threads wait for data to become available.

As such, task switching is a common approach to increasing system performance when a system invokes multiple threads. Task switching allows a processor to switch from one thread to another thread without losing its "spot" in the first thread. Task switching is different than multitasking because, in multitasking, a processor switches back and forth quickly between threads, giving the appearance that all programs are running simultaneously. In task switching, the processor does not switch back and forth between threads, but executes one thread at a time. A challenge found with task switching, however, is that task switching typically occurs at pre-determined intervals. For example, a processor may check every 10 milliseconds as to whether a particular lock has been acquired for a requesting thread.

What is needed, therefore, is a system and method to efficiently task switch between threads when a thread's requested resource becomes available.

SUMMARY

It has been discovered that the aforementioned challenges are resolved using a system and method to use a handler to detect asynchronous lock line reservation lost events, and switching tasks based upon whether a condition is true or a mutex lock is acquired.

A synergistic processing unit (SPU) invokes a first thread and, during execution, the first thread requests to update external data. The external data may be shared with other threads or processors in the system, which is protected by a mutex lock or other shared memory synchronization constructs. For example, the thread may request to update a linked data structure, which is protected by a mutex lock that prevents other threads or processors from traversing the linked data structure while the linked data structure is being updated. To participate in a mutex lock or other shared memory synchronization constructs, the SPU issues a lock line reservation to L2 memory corresponding to the thread's request. L2 memory includes a cache bus interface controller and a cache. The cache bus interface controller receives the lock line reservation, and retrieves corresponding data from the cache. The cache bus interface controller then sends the cache line data to the SPU.

For mutex lock primitives, the SPU analyzes the cache line data and determines, based upon the analysis, that the requested cache line is not available. For example, the cache line data may include a different thread's task identifier that is currently accessing the same data that the first thread wishes to access. Since the requested data is not available, the SPU switches from the first thread to a second thread. The SPU also enables asynchronous interrupts and invokes the handler to monitor incoming asynchronous interrupts.

When the cache bus interface controller determines that a "reservation is lost" for one of the cache's cache lines, the cache bus interface controller issues a "lock line reservation lost" event to inform the SPU. The handler detects the lock line reservation lost event, and sends a "get lock line reservation" to the L2 memory in order to receive updated cache line data. The cache bus interface controller receives the get lock line reservation and provides the cache line data to the SPU. The handler analyzes the cache line data and determines whether the first thread's requested cache line is now available. If the requested cache line is still not available, the handler waits for another asynchronous interrupt and the SPU continues to process the second thread.

When the handler determines that the requested cache line is available, the handler performs a "conditional store" using the first thread's task identifier in an attempt to secure a mutex lock for the first thread's requested data that is located in the cache. The conditional store operation has an associated status register, which indicates whether or not the conditional store operation succeeds. If the conditional store is successful, the SPU switches from the second thread back to the first thread and processes the first thread's original external data request.

For condition wait primitives, when the SPU receives cache line data, the SPU identifies whether a particular condition is true by analyzing the cache line data. When the thread's requested condition is not true, the SPU switches from the first thread to the second thread, enables asynchronous interrupts, and invokes a handler to monitor incoming asynchronous interrupts.

In turn, when the handler detects a lock line reservation lost event, the handler issues a get lock line reservation to L2 memory in order to receive updated cache line data. The handler analyzes the cache line data and determines whether the requested condition is true. If the condition is still not true, the handler waits for another asynchronous interrupt and the SPU continues to process the second thread. When the condition is true, the SPU switches from the second thread back to the first thread and process the thread's request.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 7A is a diagram showing an example of a processor's mutex lock pseudo-code;

FIG. 7B is a diagram showing an example of mutex lock handler pseudo-code that acquires a mutex lock based upon detecting a lock line reservation lost event;

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
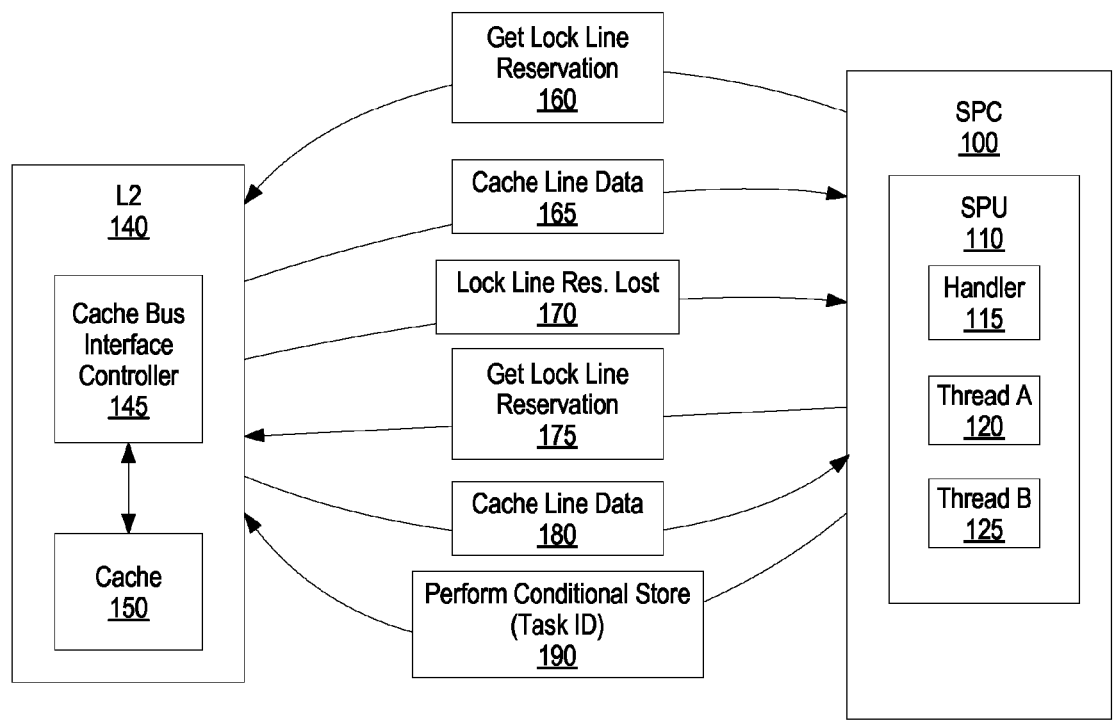
FIG. 1 is a diagram of a processor switching tasks based upon acquiring a mutex lock.

FIG. 1 is a diagram of a processor switching tasks based upon acquiring a mutex lock. Synergistic processing complex (SPC) 100 includes synergistic processing unit (SPU) 110, which processes thread A 120 (e.g., a first thread). SPU 110 is preferably a single instruction, multiple data (SIMD) processor, such as a digital signal processor, a microcontroller, a microprocessor, or a combination of these cores. During execution, thread A 120 requests external data that is located in cache 150. For example, thread A 120 may wish to update a linked data structure that is located in cache 150. SPU 110 issues get lock line reservation 160 to L2 140 corresponding to thread A 120's request. Get lock line reservation 160 instructs L2 140 to provide data from a particular cache line.

L2 140 includes cache bus interface controller 145 and cache 150. Cache bus interface controller 145 receives get lock line reservation 160, and retrieves corresponding data from cache 150. Cache bus interface controller 145 then sends cache line data 165 to SPU 110. Cache line data 165 includes data corresponding to a particular cache line. SPU 110 analyzes cache line data 165 and determines, based upon the analysis, that the requested cache line is not available. For example, cache line data 165 may include a different thread's task identifier that is currently accessing the same data as thread A 120 wishes to access.

Since the requested data is not available for thread A 120, SPU 110 switches from thread A 120 to thread B 125 (e.g., a second thread). SPU 110 also enables asynchronous interrupts and invokes handler 115 (e.g., a software subroutine) to monitor incoming asynchronous interrupts (see FIGS. 7B, 8B, and corresponding text for further details regarding handler properties).

When cache bus interface controller 145 determines that a reservation is lost for one of cache 150's cache lines, cache bus interface controller 145 issues lock line reservation lost 170 to inform SPU 110 that a reservation has been lost corresponding to one of the cache lines. Handler 115 detects lock line reservation lost 170, and sends get lock line reservation 175 to L2 140 in order to receive subsequent cache line data.

Cache bus interface controller 145 receives get lock line reservation 175 and provides cache line data 180 to SPU 110. Handler 115 analyzes cache line data 180 and determines whether the requested cache line is now available. If the requested cache line is still not available, handler 115 waits for another asynchronous interrupt and SPU 110 continues to process thread B 125.

When handler 115 determines that the requested cache line is available, handler 115 performs conditional store 190 using thread A 120's task identifier, which attempts to secure a mutex lock for thread A 120's requested data that is located in cache 150. The conditional store operation has an associated status register, which indicates whether or not the conditional store operation succeeds. If the conditional store is successful, SPU 110 switches from thread B 125 back to thread A 120 and processes thread A 120's original external data request (see FIGS. 3, 4, and corresponding text for further details regarding mutex lock primitive and handler steps).

Figure 2:
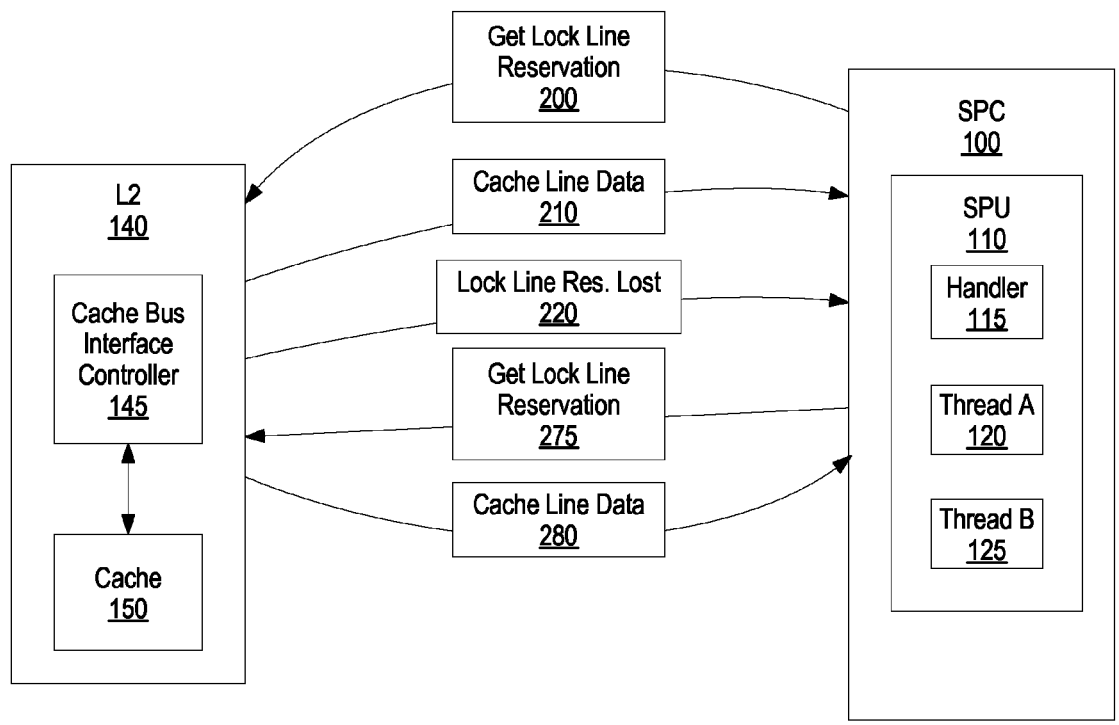
FIG. 2 is a diagram of a processor switching tasks based upon determining a condition variable is true.

FIG. 2 is a diagram of a processor switching tasks using a condition wait primitive. A condition wait primitive allows a thread to identify whether a condition has occurred by accessing cache line data, such as whether a video card has completed a vertical retrace. FIG. 2 is similar to FIG. 1 with the exception that handler 115 analyzes cache line data to determine whether a particular condition is true, such as a video card indicating that a vertical retrace is complete. SPC 100, SPU 110, handler 115, thread A 120, thread B 125, L2 140, cache bus interface controller 145, and cache 150 are the same as that shown in FIG. 1.

SPU 110 invokes thread A 120. During execution, thread A 120 requests external data that is located in cache 150 that identifies whether a particular condition is true. SPU 110 sends get lock line reservation 200 to L2 140 in order to receive cache line data 210 from cache bus interface controller 145.

SPU 110 analyzes cache line data 210 and determines, based upon the analysis, that the particular condition is not true. For example, SPU 110 may check a bit included in cache line data 210 that identifies that a video card has not completed a vertical retrace. Since thread A 120's requested condition is not true, SPU 110 switches from thread A 120 to thread B 125, enables asynchronous interrupts, and invokes handler 115 to monitor incoming asynchronous interrupts.

When cache bus interface controller 145 determines that a reservation is lost for a cache line included in cache 150, cache bus interface controller 145 issues lock line reservation lost 220 to inform SPU 110. Handler 115 detects lock line reservation lost 220, and sends get lock line reservation 275 to L2 140 in order to receive subsequent cache line data.

Cache bus interface controller 145 receives get lock line reservation 275 and, in turn, provides cache line data 280 to SPU 110. Handler 115 analyzes cache line data 280 and determines whether the requested condition is true. If the condition is still not true, handler waits for another asynchronous interrupt and SPU 110 continues to process thread B 125.

Figure 5:
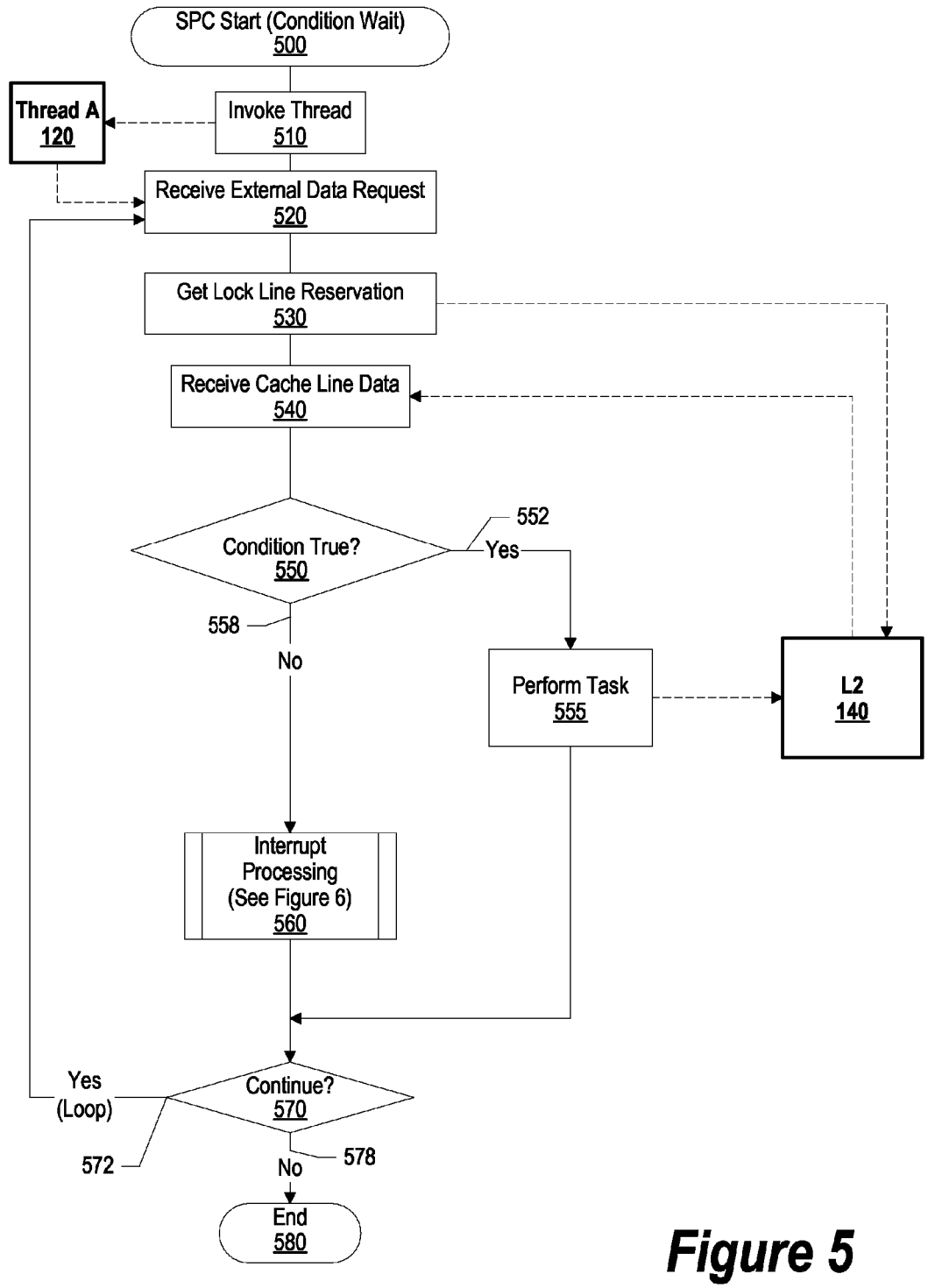
FIG. 5 is a flowchart showing steps taken in task switching between threads using a condition wait primitive.
Figure 6:
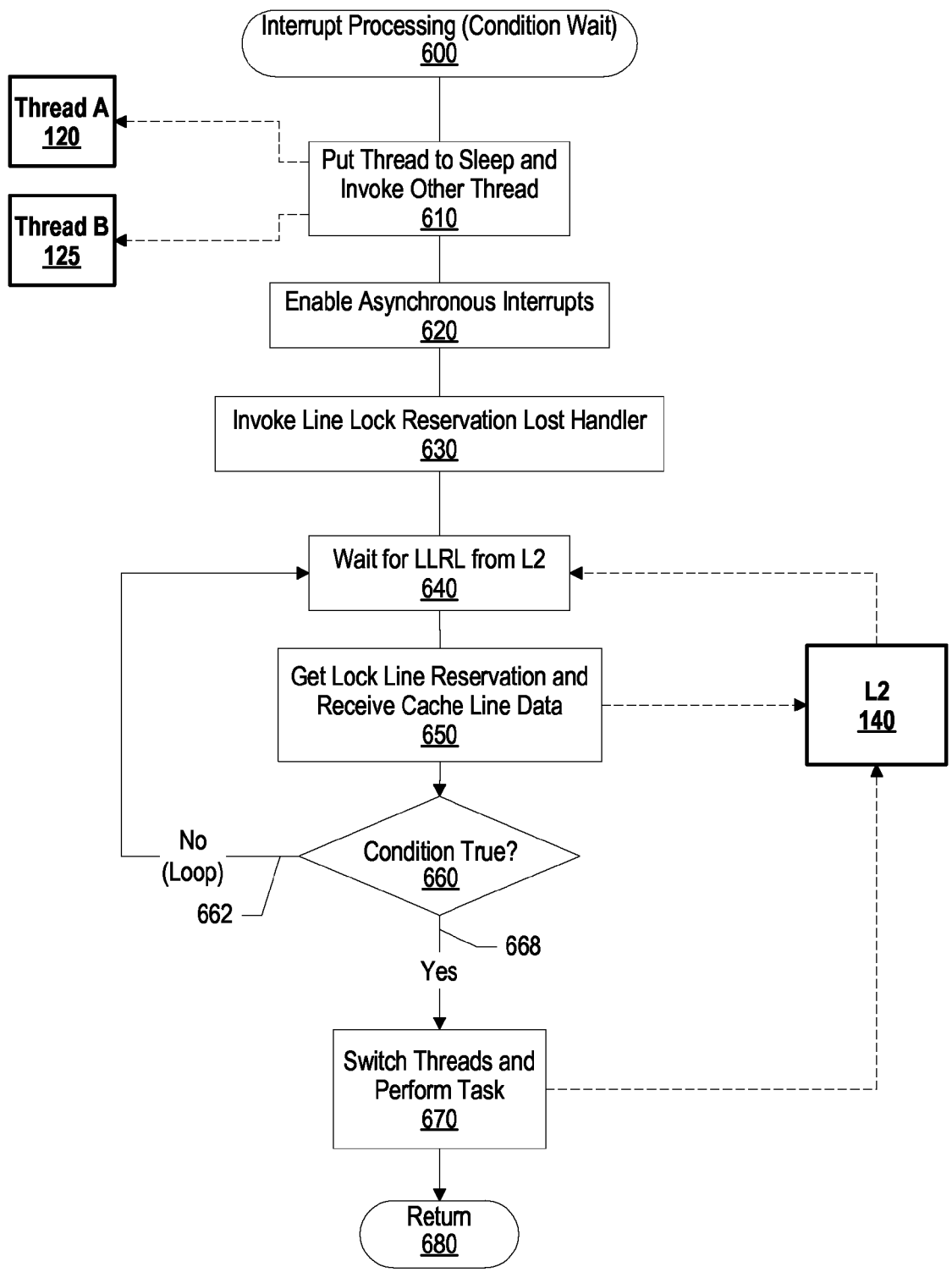
FIG. 6 is a flowchart showing steps taken in receiving asynchronous interrupts corresponding to a condition wait primitive and switching tasks in response to determining that a condition is true.

When the condition is true, SPU 110 switches from thread B 125 to thread A 120 and process thread A 120's request (see FIGS. 5, 6, and corresponding text for further details regarding condition wait primitive and handler steps).

Figure 3:
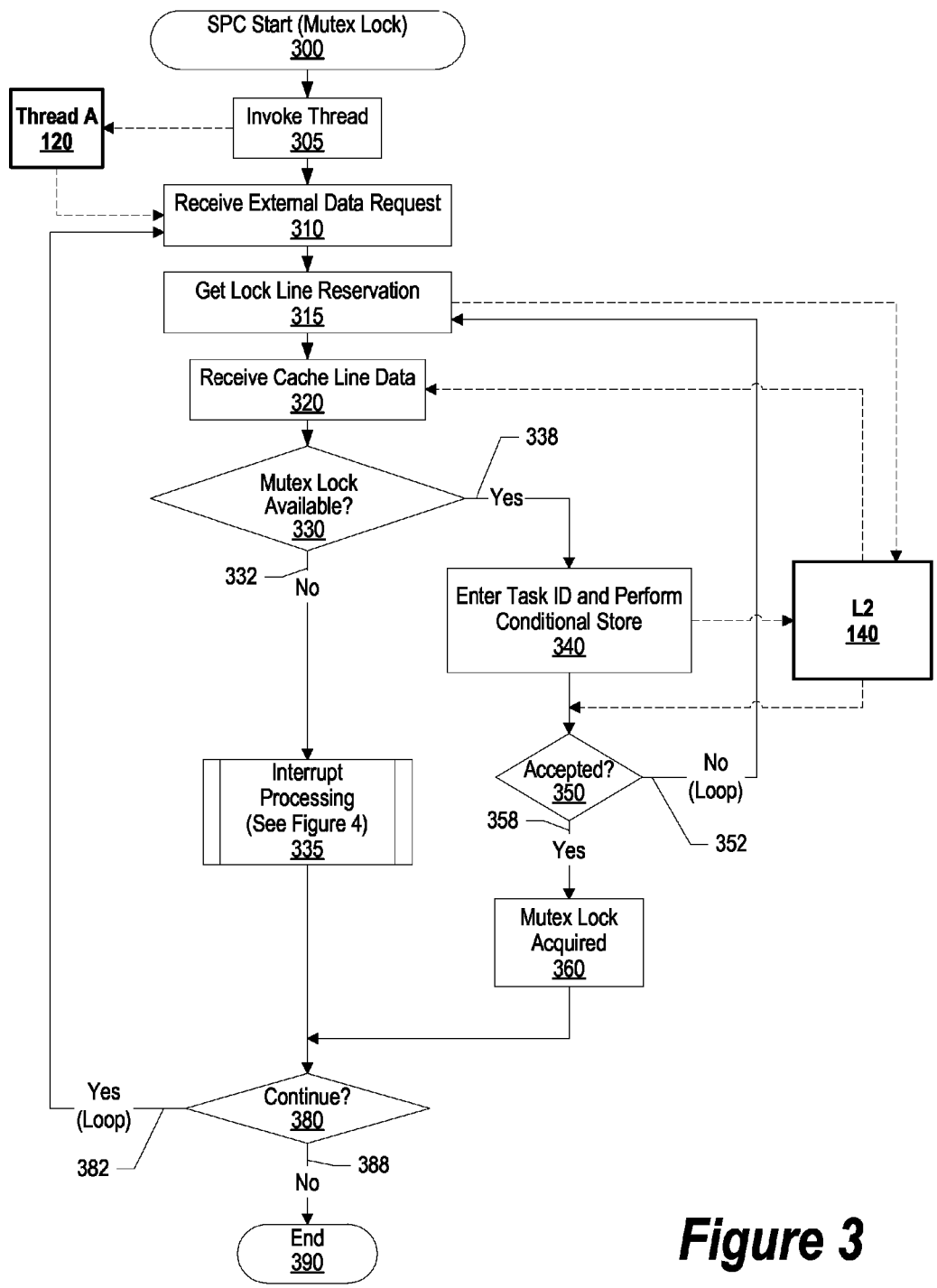
FIG. 3 is a flowchart showing steps taken in task switching between threads using a mutex lock primitive.

FIG. 3 is a flowchart showing steps taken in task switching between threads using a mutex lock primitive. A system may use a mutex lock primitive to guarantee mutual exclusion among processors operating on data within critical sections of code, such as updating a linked list data structure.

Processing commences at 300, whereupon processing invokes thread A 120 at step 305. Thread A 120 is the same as that shown in FIG. 1. At step 310, processing receives an external data request from thread A 120. For example, thread A 120 may request data corresponding to a linked data structure that is located in external memory. Thread A 120 is the same as that shown in FIG. 1.

At step 315, processing sends a get lock line reservation request to L2 140, which instructs L2 140 to provide data corresponding to a particular cache line. At step 320, processing receives the requested cache line data from L2 140. L2 140 is the same as that shown in FIG. 1.

A determination is made as to whether a mutex lock is available (decision 330). Processing determines this by analyzing the received cache line data and determining whether it includes an existing task identifier corresponding to a different thread. If the mutex lock is not available, decision 330 branches to "No" branch 332 whereupon processing switches threads and waits for a lock line reservation lost event from L2 140 (pre-defined process block 335, see FIG. 4 and corresponding text for further details).

On the other hand, if the mutex lock is available, decision 330 branches to "Yes" branch 338 whereupon processing enters thread A 120's task identifier and performs a conditional store at step 340 (see FIG. 7A and corresponding text for further details). A determination is made as to whether the conditional store is accepted in L2 140 by reading the corresponding memory location (decision 350). If the conditional store was not accepted, decision 350 branches to "No" branch 352, which loops back to send another get lock line reservation request. This looping continues until L2 140 accepts the conditional store, at which point decision 350 branches to "Yes" branch 358 whereupon processing acquires a mutex lock (step 360).

A determination is made as to whether to continue processing (decision 380). If processing should continue, decision 380 branches to "Yes" branch 382 which loops back to receive and process more external data requests. This looping continues until processing should terminate, at which point decision 380 branches to "No" branch 388 whereupon processing ends at 390.

Figure 4:
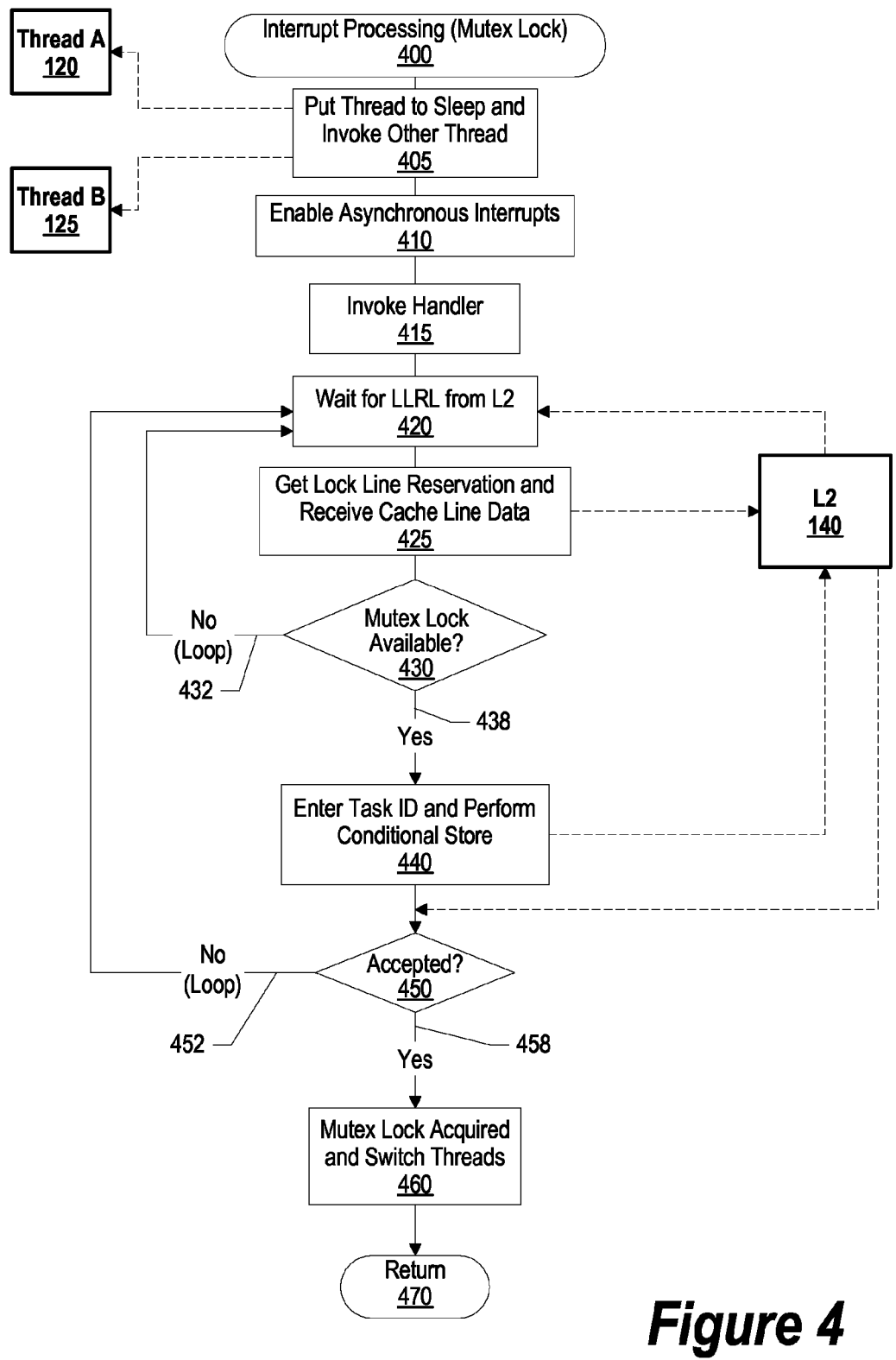
FIG. 4 is a flowchart showing steps taken in invoking a handler to process asynchronous interrupts corresponding to mutex lock requests.

FIG. 4 is a flowchart showing steps taken in invoking a handler to process asynchronous interrupts corresponding to mutex lock requests. Processing commences at 400, whereupon processing puts thread A 120 to sleep and invokes thread B 125 (step 405). Thread A 120 previously requested external data that was not available and, as such, processing switches from thread A 120 to thread B 125 until the data is available (see FIG. 3 and corresponding text for further details). Thread A 120 and thread B 125 are the same as that shown in FIG. 1.

At step 410, processing enables asynchronous interrupts in order for a handler to detect a lock line reservation lost event that corresponds to thread A 120's external data request. Processing invokes the handler at step 415, such as handler 115 shown in FIG. 1.

At step 420, the handler waits for a lock line reservation lost event from L2 140. When it receives a lock line reservation lost event, the handler, sends a get lock line reservation request to L2 140 and receives corresponding cache line data (step 425). L2 140 is the same as that shown in FIG. 1.

A determination is made as to whether the mutex lock is available by reading the cache line data (decision 430). For example, the cache line data may include a different thread's task identifier that is currently accessing the same data as the thread wishes to access, which makes the mutex lock unavailable. If the mutex lock is not available, decision 430 branches to "No" branch 432 whereupon processing loops back to wait for another lock line reservation lost event from L2 140. This looping continues until the mutex lock is available, at which point decision 430 branches to "Yes" branch 438 whereupon the handler enters thread A 120's task identifier and performs a condition store on the corresponding memory location in L2 140 (step 440, see FIG. 7B and corresponding text for further details). A determination is made as to whether the conditional store is accepted in L2 140 by reading the corresponding memory location (decision 450). If the conditional store was not accepted, decision 450 branches to "No" branch 452, which loops back to wait for another lock line reservation lost event. This looping continues until L2 140 accepts the conditional store, at which point decision 450 branches to "Yes" branch 458.

At step 460, processing acquires a mutex lock and switches back to process thread A 120's external data request. Processing returns at 470.

FIG. 5 is a flowchart showing steps taken in task switching between threads using a condition wait primitive. A processor may use a condition wait primitive to determine when a condition becomes true, such as a video card indicating that a vertical retrace is complete.

Processing commences at 500, whereupon processing invokes thread A 120 at step 510. Thread A 120 is the same as that shown in FIG. 1. At step 520, processing receives an external data request from thread A 120. For example, thread A 120 may request data corresponding to whether a video card has completed a vertical retrace. In turn, processing sends a get lock line reservation request to L2 140, which instructs L2 140 to provide data corresponding to a particular cache line (step 530). At step 540, processing receives the requested cache line data from L2 140. L2 140 is the same as that shown in FIG. 1.

A determination is made as to whether the condition corresponding to thread A 120's request is true, such as whether a video card has completed a vertical retrace by checking one of the cache line data's corresponding bits (decision 550). If processing determines that the condition is true, decision 550 branches to "Yes" branch 552 whereupon processing performs thread A 120's task at step 555.

On the other hand, if the condition is not true, decision 550 branches to "No" branch 558 whereupon processing switches threads and monitors lock line reservation lost events (pre-defined process block 560, see FIG. 6 and corresponding text for further details).

A determination is made as to whether to continue task switching steps (decision 570). If task switching should continue, decision 570 branches to "Yes" branch 572 which loops back to receive and process more external data requests. This looping continues until processing should stop executing task switching steps, at which point decision 570 branches to "No" branch 578 whereupon processing ends at 580.

FIG. 6 is a flowchart showing steps taken in receiving asynchronous interrupts corresponding to a condition wait primitive and switching tasks in response to determining that a condition is true. Processing commences at 600, whereupon processing puts thread A 120 to sleep and invokes thread B 125 (step 610). Thread A 120 previously requested external data that was not available and, as such, processing switches from thread A 120 to thread B 125 until the data is available (see FIG. 5 and corresponding text for further details). Thread A 120 and thread B 125 are the same as that shown in FIG. 1.

At step 620, processing enables asynchronous interrupts in order for processing to detect a lock line reservation lost event that corresponds to thread A 120's external data request. Processing invokes a lock line reservation handler at step 630, such as handler 115 shown in FIG. 1.

At step 640, the handler waits for a lock line reservation lost event from L2 140. When it receives a lock line reservation lost event, the handler issues a get lock line reservation request to L2 140 and receives corresponding cache line data (step 650). A determination is made as to whether the condition is true by reading the cache line data (decision 660). If the condition is not true, decision 660 branches to "No" branch 662 whereupon processing loops back to wait for another lock line reservation lost event from L2 140. This looping continues until the condition is true, at which point decision 660 branches to "Yes" branch 668 whereupon the handler switches threads and performs thread A 120's task (step 670). Processing returns at 680.

FIG. 7A is a diagram showing an example of a processor's mutex lock pseudo-code. Code 700 includes pseudo-code that tests whether a mutex lock is available and, if not, switches threads and enables asynchronous interrupts.

Code 700 includes lines 710 through 740. Line 710 performs a lock line reservation request in order to receive cache line data that signifies whether a mutex lock is available for a particular memory line. Lines 720 and 730 show that if the received cache line data is "0," indicating that a mutex lock is available, to enter a task identifier and perform a conditional store.

If a mutex lock is not available (e.g., the cache line data is not "0"), line 740 switches to another thread, invokes a handler, and enables asynchronous interrupts. The handler includes pseudo code such that, when it receives a lock line reservation lost event, the handler attempts to acquire the mutex lock (see FIG. 7B and corresponding text for further details regarding mutex lock handler pseudo code).

FIG. 7B is a diagram showing an example of mutex lock handler pseudo-code that acquires a mutex lock based upon detecting a lock line reservation lost event. Code 750 includes lines 760 through 790. Line 760 performs a lock line reservation request in order to receive cache line data that identifies whether a mutex lock is available for a particular cache line. Lines 770 and 780 show that if the received cache line data is "0," indicating that a mutex lock is available, to enter a task identifier and perform a conditional store.

If a mutex lock is not available (e.g., the cache line data is not "0"), line 785 exits the handler and waits for another lock line reservation lost event. When the conditional store is successful, the mutex lock is acquired and line 790 switches threads for further processing.

Figure 8A:
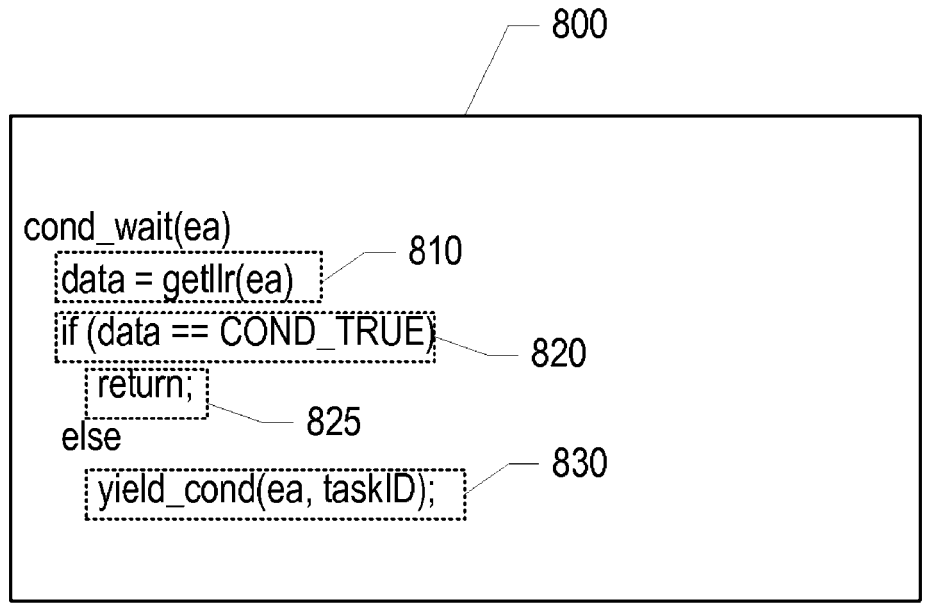
FIG. 8A is a diagram showing an example of a processor's condition wait pseudo-code.

FIG. 8A is a diagram showing an example of a processor's condition wait pseudo-code. Code 800 includes pseudo-code that tests whether a condition is true and, if not, switches threads and enables asynchronous interrupts.

Code 800 includes lines 810 through 830. Line 810 performs a lock line reservation request in order to receive cache line data that signifies whether a particular condition is true. Lines 820 and 825 show that if a condition is true, to return and continue processing the existing thread.

When the condition is not true, line 830 switches to another thread, invokes a handler, and enables asynchronous interrupts. The handler includes pseudo code such that, when it receives a lock line reservation lost event, the handler tests the condition again (see FIG. 8B and corresponding text for further details regarding condition wait handler pseudo code).

Figure 8B:
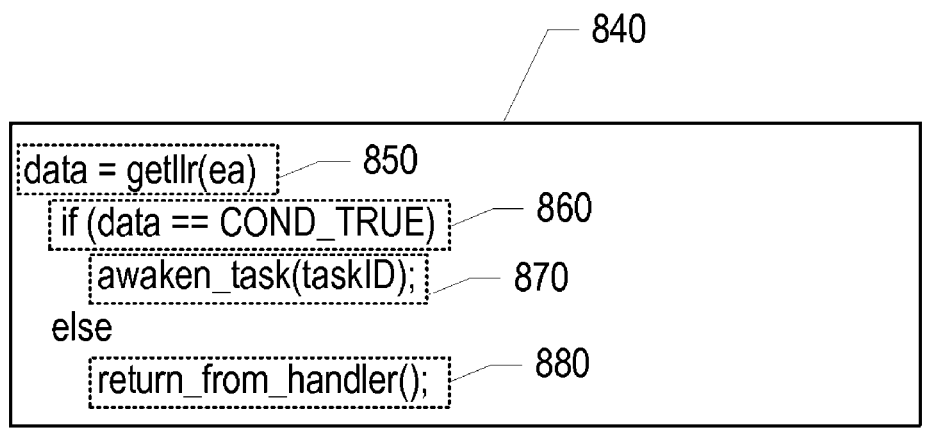
FIG. 8B is a diagram showing an example of condition wait pseudo-code that an event handler performs upon receiving a lock line reservation lost event.

FIG. 8B is a diagram showing an example of condition wait pseudo-code that an event handler performs upon receiving a lock line reservation lost event. Code 840 includes lines 850 through 880. Line 850 performs a lock line reservation request in order to receive cache line data that signifies whether a condition is true.

Lines 860 and 870 show that if the condition is true, to switch threads and continue processing. When the condition is not true, line 880 exits the handler and waits for another lock line reservation lost event.

Figure 9:
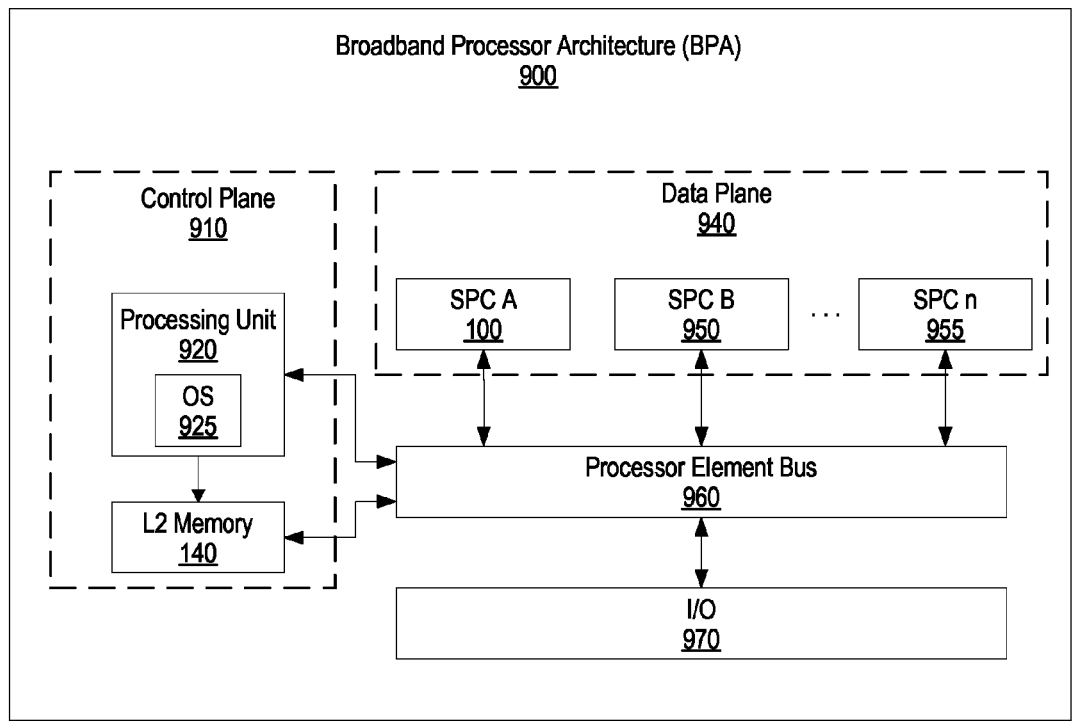
FIG. 9 is a block diagram of an information handling system capable of implementing the present invention.

FIG. 9 illustrates an information handling system, which is a simplified example of a computer system capable of performing the computing operations described herein. Broadband processor architecture (BPA) 900 includes a plurality of heterogeneous processors, a common memory, and a common bus. The heterogeneous processors are processors with different instruction sets that share the common memory and the common bus. For example, one of the heterogeneous processors may be a digital signal processor and the other heterogeneous processor may be a microprocessor, both sharing the same memory space.

BPA 900 sends and receives information to/from external devices through input output 970, and distributes the information to control plane 910 and data plane 940 using processor element bus 960. Control plane 910 manages BPA 900 and distributes work to data plane 940.

Control plane 910 includes processing unit 920, which runs operating system (OS) 925. For example, processing unit 920 may be a Power PC core that is embedded in BPA 900 and OS 925 may be a Linux operating system. Processing unit 920 manages a common memory map table for BPA 900. The memory map table corresponds to memory locations included in BPA 900, such as L2 memory 140 as well as non-private memory included in data plane 940. L2 memory 140 is the same as that shown in FIG. 1.

Data plane 940 includes Synergistic Processing Complex's (SPC) 100, 950, and 955. SPU 100 is the same as that shown in FIG. 1. Each SPC is used to process data information and each SPC may have different instruction sets. For example, BPA 900 may be used in a wireless communications system and each SPC may be responsible for separate processing tasks, such as modulation, chip rate processing, encoding, and network interfacing. In another example, each SPC may have identical instruction sets and may be used in parallel to perform operations benefiting from parallel processes. Each SPC includes a synergistic processing unit (SPU). An SPU is preferably a single instruction, multiple data (SIMD) processor, such as a digital signal processor, a microcontroller, a microprocessor, or a combination of these cores. In a preferred embodiment, each SPU includes a local memory, registers, four floating point units, and four integer units. However, depending upon the processing power required, a greater or lesser number of floating points units and integer units may be employed.

SPC 100, 950, and 955 are connected to processor element bus 960, which passes information between control plane 910, data plane 940, and input/output 970. Bus 960 is an on-chip coherent multi-processor bus that passes information between I/O 970, control plane 910, and data plane 940. Input/output 970 includes flexible input-output logic, which dynamically assigns interface pins to input output controllers based upon peripheral devices that are connected to BPA 900.

While the information handling system described in FIG. 9 is capable of executing the processes described herein, this computer system is simply one example of a computer system. Those skilled in the art will appreciate that many other computer system designs are capable of performing the processes described herein, such as gaming systems, imaging systems, seismic computer systems, and animation systems.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving an external data request from a first thread, the external data request corresponding to cache line data stored in a cache line, wherein the external data request corresponds to a condition, the condition indicating whether an operation needed by the first thread has been performed;
   identifying that the cache line data corresponding to the external data request indicates that the condition is not true;
   switching to a second thread in response to the identifying;
   receiving a lock line reservation lost event in response to the switching, wherein the lock line reservation lost event corresponds to the external data request received from the first thread;
   determining whether to switch from the second thread to the first thread in response to the lock line reservation lost event, wherein the determining further comprises:
      requesting a lock line reservation, wherein the lock line reservation instructs a cache bus interface controller to provide the cache line data;
      receiving the cache line data from the cache bus interface controller in response to the lock line reservation request; and
      analyzing the received cache line data to decide whether the condition is true, wherein the analyzing further comprises reading the received cache line data, and wherein the determining is based upon the read cache line data; and
   switching to the first thread in response to the determining.

2. The method of claim 1 wherein the lock line reservation lost event corresponds to a condition wait primitive associated with the condition.

3. The method of claim 1 further comprising:
   invoking a handler to monitor asynchronous interrupts, wherein the lock line reservation lost event is one of the asynchronous interrupts; and
   detecting the lock line reservation lost event using the handler.

4. The method of claim 3 further comprising:
   enabling asynchronous interrupts in order for the handler to perform the monitoring.

5. The method of claim 1 further comprising:
   wherein the method is performed using a broadband processor architecture, the broadband processor architecture including a plurality of heterogeneous processors, a common memory, and a common bus; and;
   wherein the plurality of heterogeneous processors use different instruction sets and share the common memory and the common bus.

6. A computer program product comprising:
   a non-transitory computer operable medium having computer readable code, the computer readable code being effective to:
      receive an external data request from a first thread, the external data request corresponding to cache line data stored in a cache line, wherein the external data request corresponds to a condition, the condition indicating whether an operation needed by the first thread has been performed;
      identify that the cache line data corresponding to the external data request indicates that the condition is not true;
      switch to a second thread in response to the identifying;
      receive a lock line reservation lost event in response to the switching, wherein the lock line reservation lost event corresponds to the external data request received from the first thread;
      determine whether to switch from the second thread to the first thread in response to the lock line reservation lost event, wherein the determining further comprises computer readable code effective to:

request a lock line reservation, wherein the lock line reservation instructs a cache bus interface controller to provide the cache line data;

receive the cache line data from the cache bus interface controller in response to the lock line reservation request; and analyze the received cache line data to decide whether the condition is true, wherein the analyzing further comprises reading the received cache line data, and wherein the determining is based upon the read cache line data; and switch to the first thread in response to the determination.

7. The computer program product of claim 6 wherein the lock line reservation lost event corresponds to a condition wait primitive associated with the condition.

8. The computer program product of claim 6 wherein the computer readable code is further effective to:

invoke a handler to monitor asynchronous interrupts, the lock line reservation lost event being one of the asynchronous interrupts; and detect the lock line reservation lost event using the handler.

9. The computer program product of claim 8 wherein the computer readable code is further effective to:

enable asynchronous interrupts in order for the handler to perform the monitoring.

10. The computer program product of claim 7 wherein the computer readable code is executed using a broadband processor architecture.

11. An information handling system comprising:

one or more processors;

a memory accessible by the processors;

one or more nonvolatile storage devices accessible by the processors; and a task-switching tool for switching tasks, the task-switching tool being effective to:

receive an external data request from a first thread, the external data request corresponding to cache line data stored in a cache line, wherein the external data request corresponds to a condition, the condition indicating whether an operation needed by the first thread has been performed;

identify that the cache line data included in the memory corresponding to the external data request indicates that the condition is not true;

switch to a second thread in response to the identifying;

receive a lock line reservation lost event in response to the switching, wherein the lock line reservation lost event corresponds to the external data request received from the first thread;

determine whether to switch from the second thread to the first thread in response to the lock line reservation lost event, wherein the task-switching tool is further effective to:

request a lock line reservation, wherein the lock line reservation instructs a cache bus interface controller to provide the cache line data;

receive the cache line data from the cache bus interface controller in response to the lock line reservation request; and analyze the received cache line data to decide whether the condition is true, wherein the analyzing further comprises reading the received cache line data, and wherein the determining is based upon the read cache line data; and switch to the first thread in response to the determination.

12. The information handling system of claim 11 wherein the lock line reservation lost event corresponds to a condition wait primitive associated with the condition.

13. The information handling system of claim 11 wherein the task-switching tool is further effective to:

invoke a handler to monitor asynchronous interrupts, the lock line reservation lost event being one of the asynchronous interrupts; and detect the lock line reservation lost event using the handler.

14. The information handling system of claim 11 wherein the information handling system is a broadband processor architecture that includes a plurality of heterogeneous processors that share the memory, the plurality of heterogeneous processors using different instruction sets.

* * * * *